Figure 1:
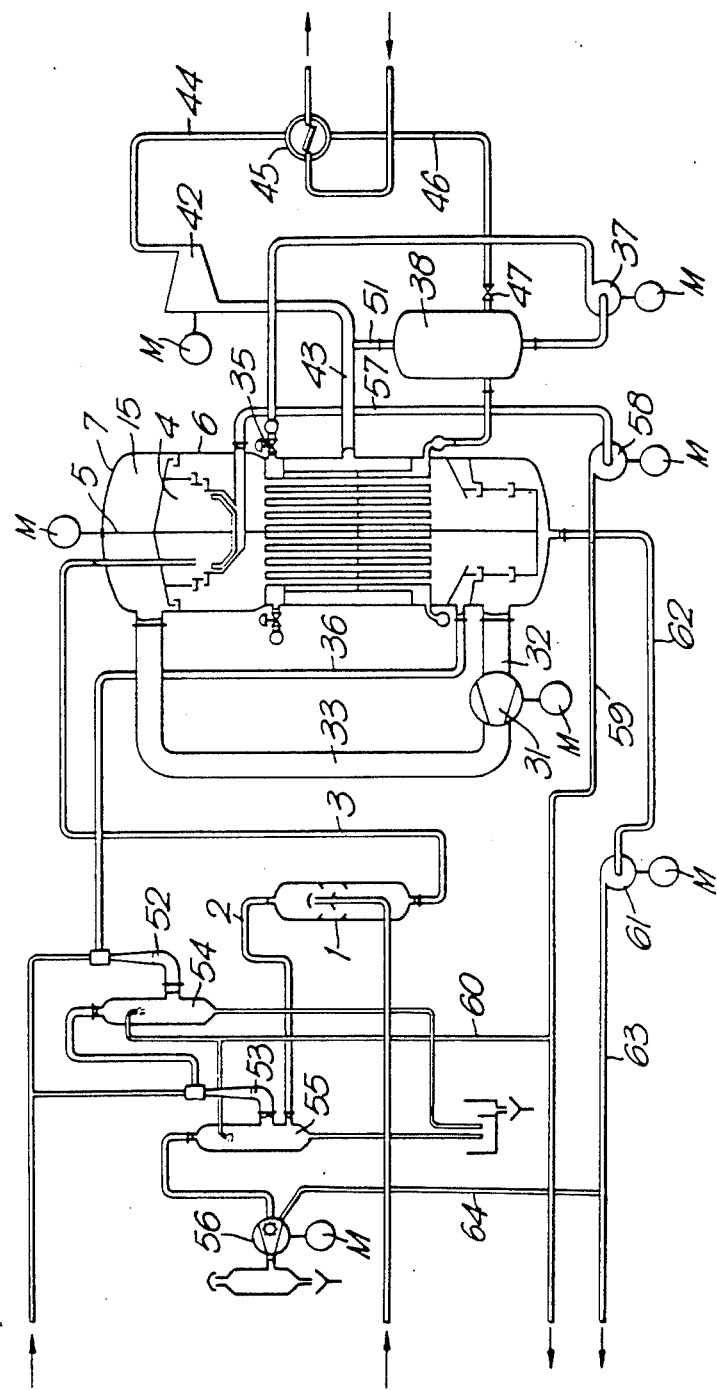

United States Patent [19]

Juhola

[11] Patent Number: 4,694,658

[45] Date of Patent: Sep. 22, 1987

[54] METHOD AND EQUIPMENT FOR UTILIZATION OF THE FREEZING HEAT OF WATER AS A SOURCE OF HEAT OF A HEAT PUMP

[75] Inventor: Pentti Juhola, Espoo, Finland

[73] Assignee: Rintekno Oy, Espoo, Finland

[21] Appl. No.: 762,192

[22] PCT Filed: Nov. 26, 1984

[86] PCT No.: PCT/FI84/00086

§ 371 Date: Jul. 19, 1985

§ 102(e) Date: Jul. 19, 1985

[87] PCT Pub. No.: WO85/02458

PCT Pub. Date: Jun. 6, 1985

[30] Foreign Application Priority Data

Nov. 25, 1983 [FI] Finland .................................. 834335

[51] Int. Cl.$^4$ ............................................. F25B 19/00
[52] U.S. Cl. ........................................ 62/100; 62/268;
62/238.5; 237/2 B

[58] Field of Search ...................... 62/238.5, 124, 324, 62/123, 268, 100, 324.1, 324.2; 237/2 B; 34/15; 159/47

[56] References Cited

U.S. PATENT DOCUMENTS 4,003,213  1/1977  Cox ................................ 62/238.5 X
4,474,031 10/1984  Collet ................................ 62/536 X Primary Examiner—Henry A. Bennet
Attorney, Agent, or Firm—Hopgood, Calimafde, Kalil, Blaustein & Judlowe

[57] ABSTRACT

Method and equipment for the utilization of the freezing heat contained in water as a source of heat of a heat pump. The water flow to be utilized as the source of heat is evaporated in one or several stages (4) at such a low pressure that, when the vapor that is formed binds its evaporation heat out of the water, part of the water freezes. The vapor formed is condensed in one or several heat exchangers functioning as the evaporator of the heat pump, whereat the vapor, on being condensed, delivers its heat to the heat transfer medium used in the heat pump.

17 Claims, 9 Drawing Figures

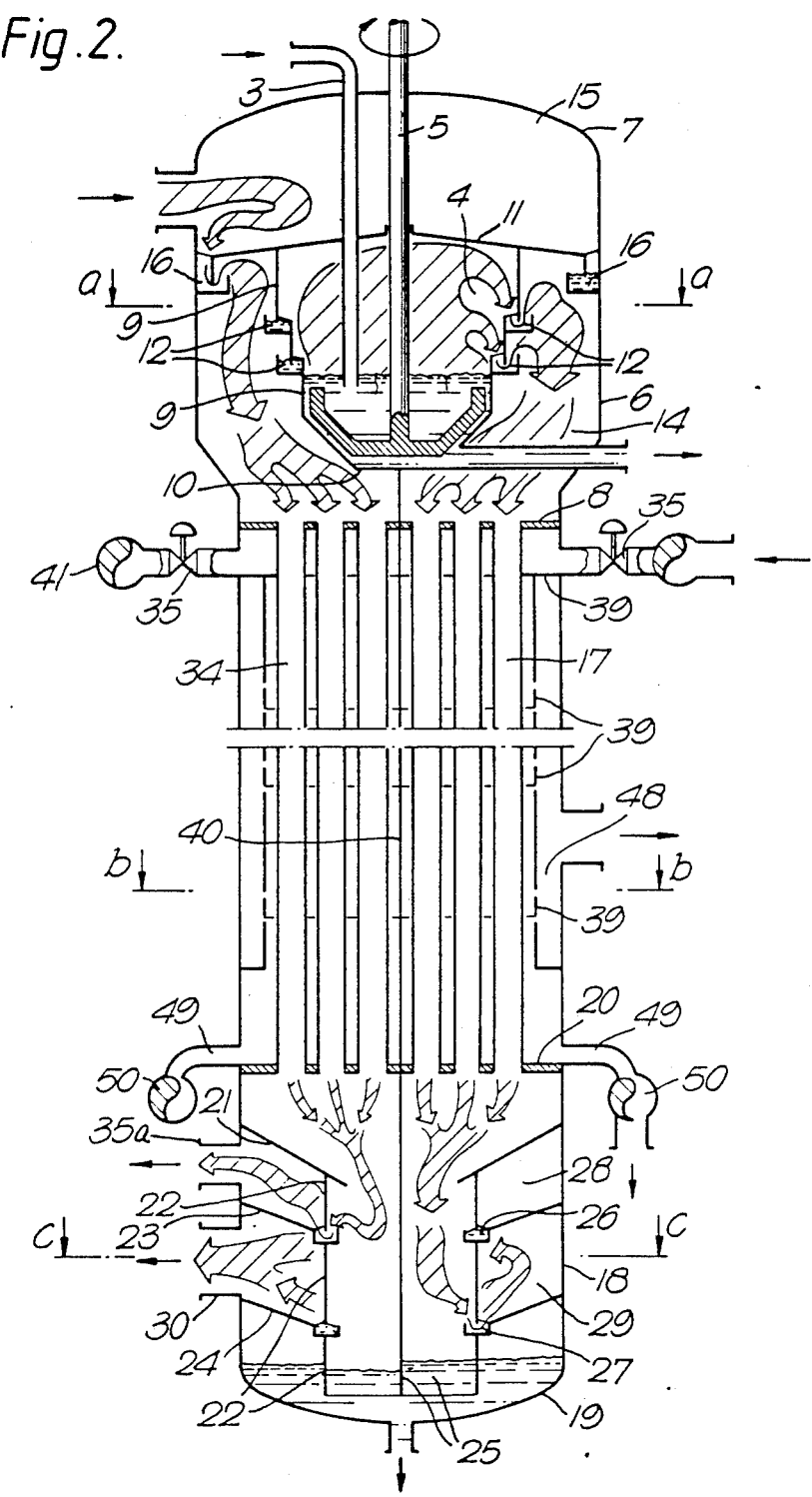

$P_0 < P_1$ $P_0 > P_1$

METHOD AND EQUIPMENT FOR UTILIZATION OF THE FREEZING HEAT OF WATER AS A SOURCE OF HEAT OF A HEAT PUMP

The present invention is concerned with a method for the utilization of the freezing heat contained in water as a source of heat of a heat pump. The invention is also concerned with equipment for carrying out the method, which said equipment consists of a possible gas remover, of a crystallizer provided with an agitator, of a combined water-vapour condenser/evaporator of the heat pump, of a compressor unit of the heat pump, of a circulation tank for the medium, of a condenser of the heat pump, of the necessary pumps, of the necessary vacuum equipment, of a possible apparatus for the separation of water and ice crystals from each other, as well as of an apparatus for the generation of melting steam of sufficiently high pressure. The method in accordance with the present invention is characterized in that the water flow to be utilized as a source of heat is evaporated in one or several stages at such a low pressure that, when the vapour that is formed binds its evaporation heat out of the water, part of the water freezes, and that the vapour formed is condensed in one or several heat exchangers functioning as the evaporator of the heat pump, whereat the vapour, on being condensed, delivers its heat to the heat transfer medium used in the heat pump. The equipment in accordance with the invention is characterized in that the crystallizer and the water-vapour condenser are built substantially as one unit between which no separate pipe lines are required.

Thus, the subject of the present invention is a method and equipment for the utilization of the crystallization or freezing heat of water as a source of heat of a heat pump by evaporation of water at such a low pressure that, when part of the water flow to be utilized evaporates and takes its evaporation heat from the remaining water flow, part of this water flow freezes and ice crystals are formed in the water. The vapour formed is passed into the evaporator of the heat pump, where it, on being condensed and frozen on the heat face, delivers its heat to the medium used in the heat pump. By means of a continuous melting system operating during the process, the layer of ice formed on the heat faces of the evaporator is kept sufficiently thin, whereat the efficiency of the heat transfer can also be maintained.

Along with the increase in the cost of energy, the utilization of heat pumps in particular for producing heating energy for buildings has been increased considerably in the last few years.

Along with the increased utilization of heat pumps, the heat pump technology has also been developed remarkably. To-day, the problem is not so much contained in the equipment technology itself, but the problem is how to find suitable economically utilizable sources of heat. Attempts have been made, and are made, to make use of most varied sources of heat.

For large heat pumps, mainly providing municipal heating, various waters are almost the only source of heat that can be utilized economically to a larger extent.

When the suitablility of different flows of water for a source of heat is estimated, attention must be paid in particular to the following factors:

Stability of the Source of Heat

Economical use of a heat pump requires a high degree of utilization of the capacity, which again requires a sufficiently stable flow of water.

Temperature Level of the Water

The higher the temperature level fo the flow of water to be utilized, the higher is the coefficient of performance of the heat pump and the better is the profitability of the heat pump.

It is another, also highly important factor that the higher the inlet temperature of the flow of water to be utilized, the higher is its heat content per unit of mass and the smaller is the flow of water that is sufficient as the source of heat.

It is a real problem in the northern latitudes, so also in Finland, that the temperatures of almost all water flows are very low during the winter season, at which time, on the other hand, the requirement of heat is at the maximum.

This is why very large flows of water are needed as sources of heat and, nevertheless, the heat pumps cannot be run at full power with certainty during the coldest seasons, owing to the risk of freezing of the evaporators.

Corrosion Properties of the Water

Waste waters both from industries and from communities are in most cases well suitable for sources of heat both in respect of their quantity and in respect of their temperature level. Waste waters often involve the drawback that they corrode normal constructional materials. This is why, in the evaporators of heat pumps, quite expensive material solutions are often necessary.

The case is the same when attempts are made to utilize ground-water flows or sea water as a source of heat.

The risk of corrosion always increases the investment cost of the equipment, and during operation the corrosion also has an essential effect on the cost of operation and maintenance of the plant as well as on its availability.

Contaminating Effect of the Water

Like the corrosion of the heat transfer surfaces in the evaporators, a probable rapid contamination of the heat transfer surfaces also increases the investment cost of the plant. Contamination of the heat in operation also always increases the cost of operation and maintenance of the plant and deteriorates the usability of the plant.

Corrosion and contamination of the heat transfer surfaces also often occur together, one of them being the cause and the other one the consequence, i.e. a corroded surface is always contaminated rapidly and, vice versa, the progress of corrosion may be rapid under a layer of contamination.

By means of the method and equipment subject of the present invention, the main part of these risk factors of heat pumps utilizing various waters as the source of heat have been eliminated. At the same time, attempts have been made to widen the range of use of the heat pump by making the use of the heat pump less dependent on the size and temperature of the water serving as the source of heat.

The following factors can be considered the most important advantages of the method subject of the invention, utilizing the crystallization or freezing heat of water, as compared with the heat pump solutions available on the market and using water as the source of heat:

When the method is used, the capacity of the heat pump is not essentially dependent on the temperature of the flow of water used as the source of heat, for by means of the method it is possible to utilize even water flows at 0° C.

When the method is used, an essentially smaller flow of water is sufficient for a heat pump of the same capacity.

When the method is used, the place of location of the heat pump can be chosen more freely, because large flows of water need not be transferred.

When the method is used, the piping and pumping costs of the heat pump system remain low.

The use of the method also eliminates the risk of freeze damage to the equipment.

The risks of corrosion of the heat transfer surfaces have been eliminated, because of which it is possible to use inexpensive materials of construction.

The invention will be described in the following in more detail by means of examples with reference to the attached drawings, which illustrate some embodiments and equipment constructions of the invention.

Figure 2A:
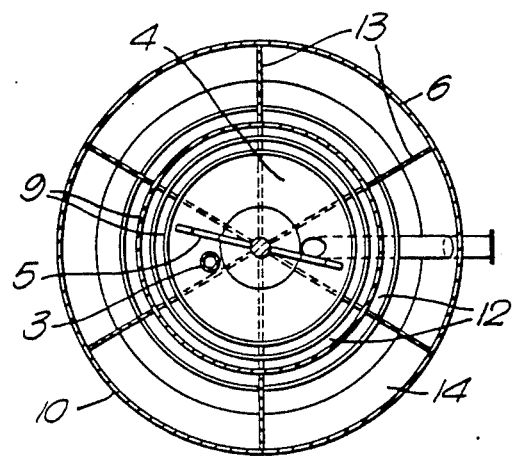
Figure 2B:
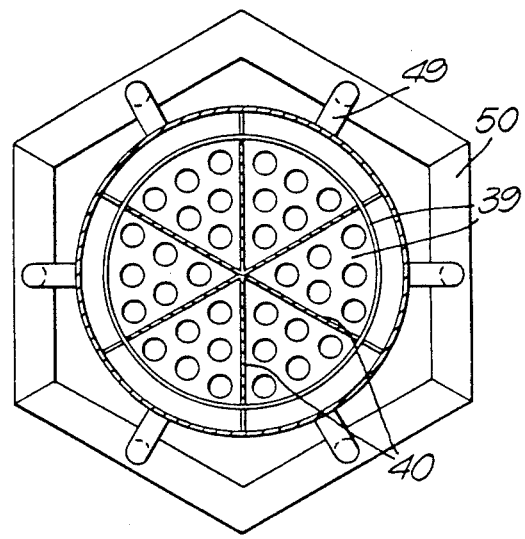
Figure 2C:
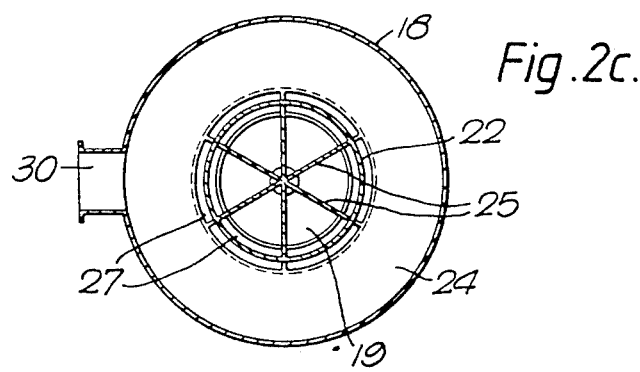
Figure 3:
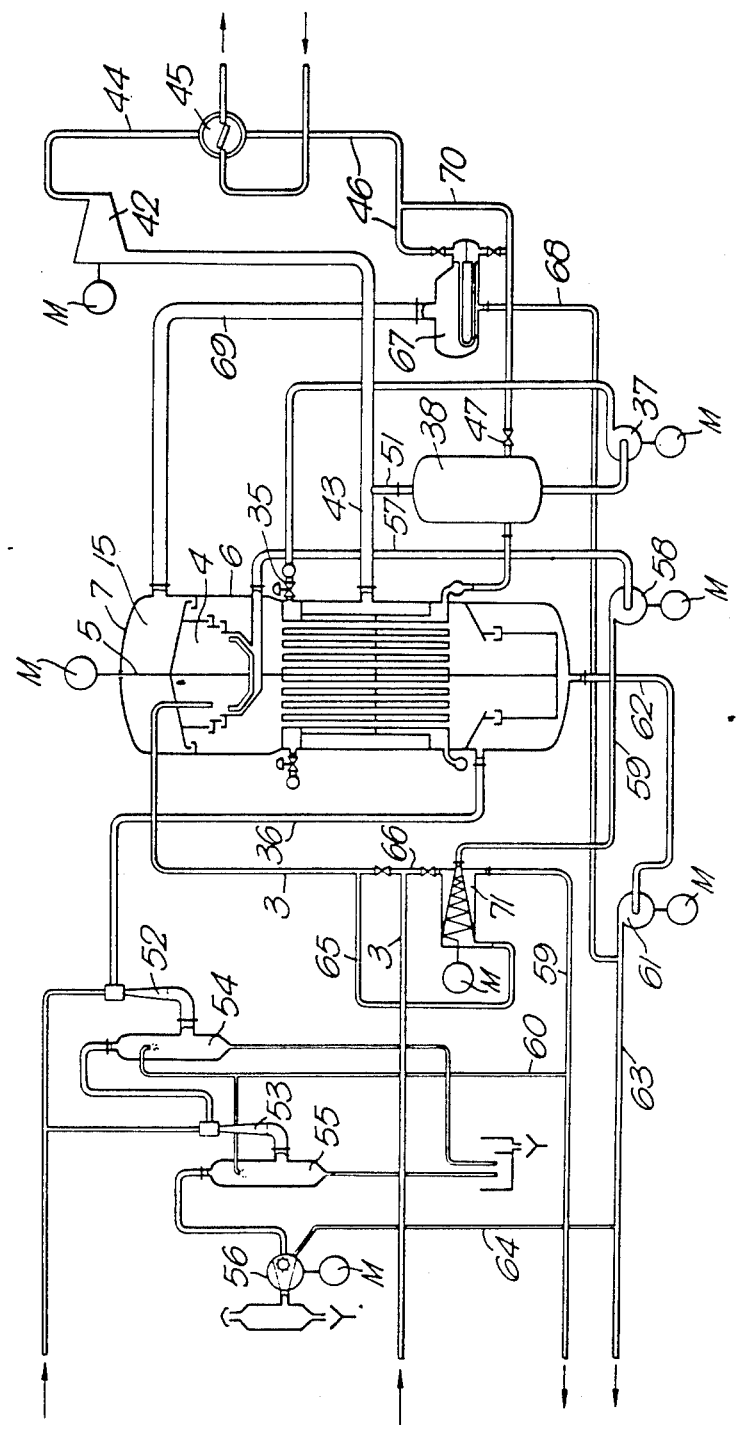
Figure 4A:
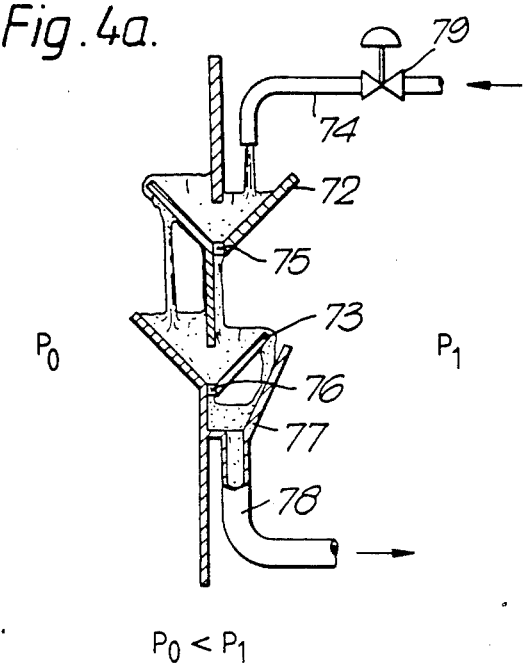
Figure 4B:
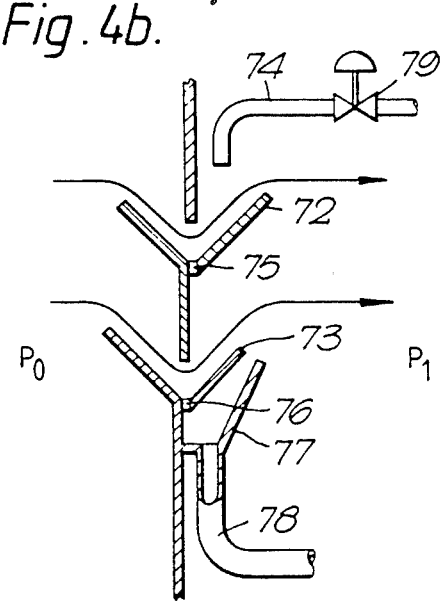
Figure 5:
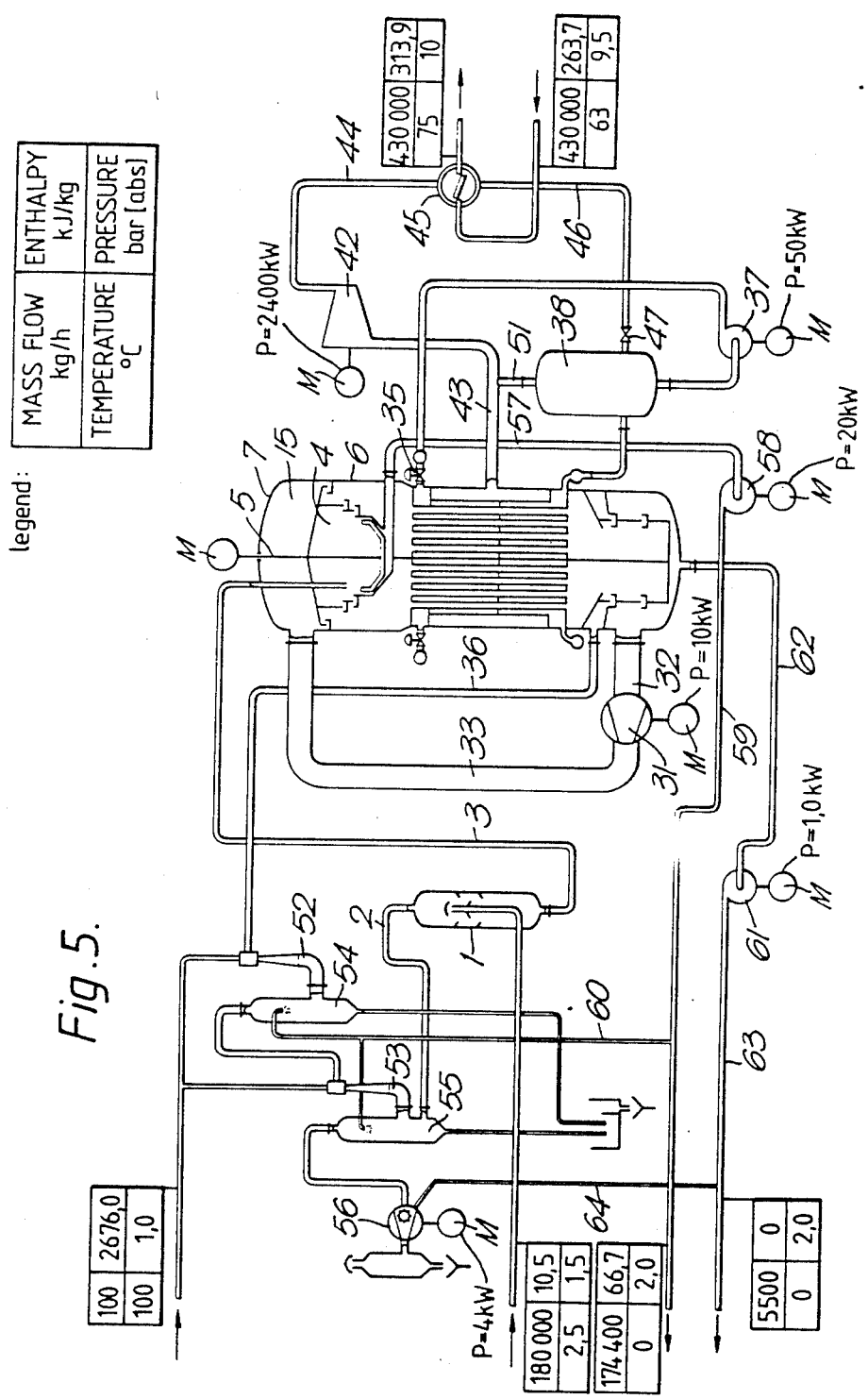

FIG. 1 is a schematical illustration of the principle of operation of a system applying the method in accordance with the invention, FIG. 2 shows the operation and construction of the crystallizer and of the condenser-evaporator as a vertical section, FIGS. 2a, 2b and 2c show sections a—a, b—b and c—c in FIG. 2, FIG. 3 shows certain applications of the system shown in FIG. 1, FIGS. 4a and 4b show the principle of construction and operation of the liquid seals used for controlling the vapour flows, FIG. 5 shows the heat and mass balances of a heat pump of a power of 6 MW accomplished by means of the system in accordance with FIG. 1.

In the system shown in FIG. 1, the water flow to be utilized as the source of heat is first passed into a deaerator 1 (=degasifier) operating at negative pressure. The function of the deaerator 1 is to remove most of the air and other gases dissolved in the water and to prevent their access to the condenser, whose operation would be hampered by them.

Also, in the deaerator 1 the pressure is higher than in the condenser, so that it is preferable to remove most of the gases there and thereby to obtain economies both in the investment cost and in the operating cost of the vacuum system.

The operation of the deaerator 1 is based on the fact that the solubility of air (=gases) in water is proporational to the partial pressure of the air in the gas phase. On the other hand, according to the definition, the partial pressure of air is equal to the mole fraction of air in the gas phase multiplied by the total pressure. In the deaerator, the total pressure consists of the vapour pressure of the water, which is just a function of the temperature, and of the partial pressure of the air (=gases) present. Thus, when we reduce the total pressure, the partial pressure of the air in the gas phase and, at the same time, the solubility of air in water are also reduced. The water passed into the deaerator strives for a state of equilibrium with the gas phase, whereat part of the air dissolved in the water becomes free. In an ideal state, the air content in the flow of water leaving the deaerator is at equilibrium with the flow of gas discharged from the deaerator.

How near the state of equilibrium it is possible to come in the deaerator is essentially dependent on the construction of the deaerator. The theoretical air content of the water discharged from the deaerator is the lower, the higher the temperature or the lower the pressure.

The gases liberated in the deaerator are passed through the pipe line 2 into the vacuum system.

On the other hand, the deaerated water is passed from the deaerator 1 through the pipe line 3 into the crystallizer 4, where there is a negative pressure corresponding to the vapour pressure of the water at the freezing point. Thus, in the crystallizer 4 the water is boiling at the temperature of about 0° C. corresponding to this pressure, whereby part of the water evaporates. The evaporation binds heat out of the water, whereby part of the water is frozen and crystals of ice are formed in the water. If the temperature of the water arriving in the crystallizer 4 is near 0° C., it can be calculated that about 7.4 kg of ice are formed per 1 kg of vapour. The crystallizer 4 is provided with an agitator 5, by means of which uniform crystallization of the water is guaranteed.

In FIG. 2, the crystallizer 4 is placed inside the top end of a tubular heat exchanger of vertical design. When a built-in crystallizer construction 4 is used, the large steam pipings are avoided that would be necessary otherwise.

The top end of the heat exchanger is defined by a mantle 6, a head 7, and by an upper tube sheet 8. The cylindrical crystallizer 4, which is defined by mantle parts 9, by a bottom 10, and by a ceiling 11, is separated by liquid seals 12 from the surrounding annular space 14, which is divided by partition walls 13 into sectors.

Above the crystallizer, there is a unified annular space 15, which is separated by a liquid seal 16 from the annular space 14 surrounding the crystallizer 4 and divided into sectors. The partition walls 13 of the annular space 14 also divide both the liquid seals 12 and the liquid seal 16 into sectors. In the construction shown in FIG. 2, the annular space 14 is divided into six sectors. The liquid seals 12 are empty in five sectors out of the six sectors, whereby the vapour formed in the crystallizer 4 has a free path of flow through the said five liquid seals into the corresponding sectors of the annular space 14 and through them into the tubes 17 in the five sectors in the condenser. This flow is illustrated on the right side of FIG. 2.

The vapour condenses on the inside faces of the pipes 17 and delivers its heat to the circulating medium of the heat pump system, flowing along the outside faces of the pipes 17, and vaporizes the medium, Since the condensation of the vapour takes place at a temperature of about 0° C. (or slightly lower) and since the temperature of the medium to be vaporized is about −5° C., the layer of condensate formed on the inside faces of the pipes 17 freezes on the condensation face.

The uncondensed part of the vapour flows out of the tubes 17 into the bottom part of the heat exchanger, which is defined by a mantle 18, a head 19, and by a lower tube sheet 20, and it is divided into compartments by partition walls 21, 22, 23, and 24. The central part is divided into six sectors by means of partition walls 25, which said sectors communicate via liquid seals 26 and 27 with the unified annular spaces 28 and 29 surrounding them.

When the vapour flows into the lower part of the heat exchanger, out of the lower liquid seals 27, the liquid seals 27 of those five sectors are empty (=open) that correspond to the liquid seals 12 open at the upper end to the five sectors in the crystallizer 4 and in the surrounding space.

The vapour flows through the open liquid seals 27 into the annular space 29, which communicates through the duct 30 with the intake line 32 of the blower 31.

The blower 31 sucks vapour from the pressure of about 6 mbar prevailing at the lower end of the condenser and increases the pressure by about 1 ... 2 mbar, which corresponds to an increase in the condensation temperature by about 2° ... 4° C. The vapour brought under a higher pressure is passed from the blower 31 through the pipe line 33 into the annular space 15 at the top end of the heat exchanger.

Out of the liquid seals 16 between the space 15 and the space 14 surrounding the crystallizer 4, the liquid seals 16 passing to those five sectors are full (=closed) that communicate with the liquid seals 12 of the crystallizer 4 that are open.

The liquid seal 16 of the sector passing to the sixth condenser part, i.e. to the condenser part that is at the melting stage, is open, so that the vapour has a free path of flow through that liquid seal to the condenser tubes 34 of the corresponding sector (see left side of FIG. 2). The vapour flowing into the tubes 34 condenses on the layer of ice covering the walls of the tubes 34 and delivers its condensation heat, whereby the ice melts.

At the same time, the sector of the condenser part at the melting stage is also separated from the evaporator circuit of the medium of the heat pump by closing the medium circulation valve 35 passing into this sector of the evaporator.

The water formed on melting of the ice and on condensation of the vapour flows along tubes 34 into the corresponding sector space in the lower end of the condenser, into which space the uncondensed part of the vapour also flows.

In the lower part, the lower liquid seal 27 of the sector space at the melting stage, passing into the annular space 29, is closed and the upper liquid seal 26, passing into the annular space 28, is open. The uncondensed part of the vapour flow flows through this liquid seal 26 into the annular space 28, which communicates with the vacuum system via the duct 35a and the pipe line 36. By means of the vacuum system, the pressure in the condenser part at the melting stage is adjusted to the appropriate level by out of it sucking the necessary quantity of uncondensed gases. The pressure in the crystallizer 4 is also determined in accordance with this pressure, being by the difference between the delivery head of the blower and the pressure losses in the system lower than this pressure.

The compressor circuit of the heat pump, with its medium circulation, related to the system, is in principle as follows:

The medium to be vaporized (e.g., R-12, which is dichloro-difluoromethane) is circulated by means of the pump 37 from the tank 38 into the upper part of the evaporator divided into sectors, from where it is, by means of nozzle basin 39, guided so as to flow as a liquid film onto the outer faces of the tubes 17. The medium absorbs the heat delivered by the vapour condensing on the inside faces of the tubes 17, whereby part of the flowing liquid film vaporizes.

The distribution of the medium circulation into the individual sectors of the evaporator, divided by plates 40 into separate sectors, takes place by means of a distribution manifold 41 and valves 35. By closing the valve 35 passing into the sector at the melting stage, medium circulation into this sector is prevented, whereby this sector becomes completely empty of the liquid medium.

Thereby, no transfer of heat takes place outwards from the pipes 34, whereby the melting stage is accelerated essentially.

The vaporized gaseous medium flows from the evaporator into the intake line 43 of the compressor 42. By means of the compressor 42, the pressure of the gas is increased to such an extent that its condensation temperature is sufficient, e.g., for heating the water for municipal heating.

From the pressure side of the compressor 42, the gas flow is passed through the pipe line 44 into the heat exchanger 45 of municipal heating, which functions as the condenser and in which the gas condenses and delivers its condensation heat to the water of municipal heating. The condensed liquid medium is returned from the condenser 45 through the pipe line 46 and the expansion valve (=pressure reduction valve) 47 back into the tank 38.

The unvaporized liquid medium flows to underneath the line 43 and from each sector of the mantle space 48 of the evaporator part through the pipes 49 into the collection manifold 50 and through it further into the tank 38. The liquid collection manifold 50 is placed underneath the lower tube sheet 20 of the evaporator, which said arrangement permits complete emptying of the sector at the melting stage through the pipe 49. The gas space of the tank 38 is connected by means of a pipe line 51 to the intake line 43 of the compressor 42 for the purpose of equalizing any differences in pressure.

The vacuum equipment of the system shown in FIG. 1 consists of a two-stage ejector system, which comprises ejectors 52 and 53 and barometric jet condensers 54 and 55, placed after the ejectors, as well as a liquid ring vacuum pump 56 connected after them. The gas removing line 2 of the deaerator 1 is connected to the jet condenser 55 after the second ejector stage 53.

From the crystallizer 4, the water flow containing ice crystals is removed through the pipe line 57 to the pump 58, by means of which the water is returned through the pipe line 59, e.g., into a natural water system. This water flow is utilized by from the pipe line 59 passing water through the pipe line 60 to the jet condensers 54 and 55. By using cold water, the consumption of energy of the entire vacuum system can be made very low.

The condensate (=distilled water) collected at the lower end 19 of the condenser part is transferred by means of the pump 61 along the pipe lines 62 and 63 so as to be used, e.g., as feed water for the boiler. In the system shown in FIG. 1, this water has also been passed through the pipe line 64 so as to be used as sealing water for the liquid ring vacuum pump 56.

In the system shown in FIG. 3, the deaerator 1 has been substituted for by a centrifuge 71, by means of which the ice crystals are separated from the water flow coming out of the crystallizer 4 and containing ice crystals, and the water is returned through the pipe line 65 back into the crystallizer 4.

By in this way returning the water back to the crystallizer 4, the requirement of additional water is reduced and it has been possible to omit the deaerator 1. Only such a quantity of additional water, to be supplied through the pipe line 3, is required as corresponds to the ice crystals and to the water flow passing along with the crystals as well as to the flow of condensate water escaping through the pipe line 63.

Of course, if there is no other use for the condensate water, it may also be returned back to the crystallizer 4.

In practice, the recirculaton of water is limited by the fact that the impurities contained in the water flow to be utilized are concentrated in the water recirculated, whereby the freezing point of the water and the corresponding vapour pressure are lowered. The extent to which it is possible or profitable to recirculate the water, consequently, depends on the quality of the water to be utilized, e.g. on the salt content of the water, to a considerable extent.

By means of the component flow, of the water flow to be utilized, passed through the pipe line 66 into the centrifuge 71, the ice crystals are washed out of the centrifuge 71 into the pipe line 59. The quantity of the washing water should be preferably chosen as large enough so that the water flow after the centrifuge 71, which contains ice crystals, can be transferred by pumping.

In the system shown in FIG. 3, the blower 31 used for raising the pressure of the melting vapour has also been omitted. The melting vapour is generated in the system shown in FIG. 3 so that the medium of the heat pump circulation to be returned from the heat exchanger 45 of municipal heating through the pipe line 46 and the expansion valve 47 into the tank 38 is passed through the evaporator 67. The medium flowing through the evaporator 67 is cooled and delivers its heat, through the heat transfer surface, to the water to be passed through the pipe line 68 into the evaporator 67, which water vaporizes.

The vapour formed is passed from the evaporator 67 through the pipe line 69 into the annular space 15 above the crystallizer 4, from which space it is passed through the liquid seals 16 into the condenser sector being at the melting stage at the particular time. The quantity of the vapour to be generated can be controlled by allowing part of the medium flow to by-pass the evaporator 67 through the pipe line 70.

Thereat, the lower end of the construction of the evaporator-condenser shown in FIG. 2 has also been modified by removing the lower liquid seals 27 and the wall 23 separating the annular spaces 28 and 29 as well as the pipe duct 30 passing to the blower. In this arrangement, the liquid seal 26 of the sector that is at the melting stage is kept closed, whereat the pressure in this sector remains higher by the difference in pressure corresponding to the difference in height between the liquid columns in the liquid seal.

In view of preventing an accumulation of uncondensed gases, there is a hole in the wall 22 separating each sector from the surrounding annular space 28, which said hole permits a little, controlled flow of vapour from the sector at the melting stage into the annular space 28.

The principle of construction and operation of the liquid seals used for controlling the vapour flows and for producing the differences in pressure is illustrated in FIGS. 4a and 4b. In FIG. 4a, the liquid seals 72 and 73 are closed, i.e. they prevent flow of gas and maintain a difference in pressure across the wall. In FIG. 4b, the liquid seals 72 and 73 are empty, i.e. they permit a flow of gas through the liquid seals.

Thus, the liquid seals 72 and 73 operate in the way of valves, and they remain full (=closed) only when liquid is all the time flowing to the upper one of them, i.e. to the seal 72, through the pipe line 74. From the upper liquid seal 72 the liquid flows to the lower liquid seal 73 as overflow and also through the hole 75 in the bottom of the upper liquid seal 72. From the lower liquid seal 73, the liquid flows further as overflow and through the hole 76 into a liquid collector trough 77, from which it can be returned via the pipe line 78, e.g., so as to be reused.

If water is used as sealing liquid, the overflow from the lower liquid seal 73 and its emptying may take place, e.g. in the case of the liquid seals 12 shown in FIG. 2, straight to among the water present in the crystallizer.

If some salt solution (e.g. calcium chloride), oil, or some other liquid that is sufficiently fluid and that has a sufficiently low vapour pressure is used as sealing liquid, freezing of the liquid seals during operation can be prevented. If necessary, the sealing liquid may also be heated.

When the valve 79 of the pipe line 74 is closed, the flow of liquid stops, whereby both of the liquid seals 72 and 73 are emptied through the holes 75 and 76 in the bottoms and the flow paths for vapour are opened.

By, in accordance with FIGS. 4a and 4b, connecting several liquid seals in parallel from the point of view of vapour flow and in series from the point of view of sealing-liquid flow, what is achieved at the same time is large flow channels for vapour, small size of the liquid seals, and simple control of the liquid seals into their open-closed positions.

In the examples shown in FIGS. 1 and 3, two modes are dealt with for generating the sufficiently highly pressurized vapour required by the melting of the ice formed on the condenser faces, namely:

In the example of FIG. 1, by compressing part of the vapour formed in the crystallizer to the higher pressure required by the melting.

If it is calculated how much vapour is required for melting in an extreme case in which all the condensed water is frozen on the condenser face, the conclusion is reached that the melting of the ice requires about 12% of the total vapour quantity formed in the crystallizer. The melting does, however, not consume any of the quantity of heat liberated from the utilized flow of water in the crystallizer, but it just prevents the possibility that the quantity of heat becoming free on freezing of the condensate could no longer be taken advantage of; but what is frozen must also be melted.

In the system shown in FIG. 1, a centrifugal blower 31 has been used for compressing the vapour. It is, of course, also possible to use compressors of different types and, e.g., vapour ejectors.

In the example of FIG. 3, the melting vapour has been generated in a separate heat exchanger 67, in which the high return temperature of the medium circulation of the heat pump has been utilized as the heating material.

This vapour of higher pressure, generated in the heat exchanger 67, is then passed so as to be used for melting.

In some cases, it may be preferable to generate only warm water in this heat exchanger, which warm water is then passed to the melting stage, whereby part of it vaporizes as a result of a reduction in pressure, and the vapour formed can be passed to the melting for being used there. When this procedure is used, it is also possible to avoid the large vapour pipings required by large volumetric flows of vapour. Vapour pipings can also be avoided by building this evaporator—in a way similar to the crystallizer—substantially as one unit with the condenser.

Further modes of producing the vapour or the warm water required by the melting, vapour becoming free from the warm water on reduction of pressure, with the use of the method, could be, e.g.:

1. An external source of heat, such as a steam supply network, water of municipal heating, etc. These may also be used either directly or by just taking advantage of their heat content for generating the vapour for melting.
2. The input temperature of the water to be utilized can also be taken advantage of in the cases in which the input temperature of the water is high enough.

If it is calculated, e.g., that 20% of the flow of water passed into the crystallizer is frozen (=cystallized), it can be calculated that an input temperature of about 6° C. of the water is sufficient to permit a generation of the melting vapour in all situations by using the heat content of the water's own. Thereat, the method is such that the pressure of this water is reduced before it is passed into the crystallizer, e.g., to a pressure corresponding to a boiling point of +3° C. of the water, whereby about 0.5% of the water vaporizes and can be passed to the melting to be utilized there.

In the method in accordance with the invention, the following procedure may also be applied to the melting of the ice formed on the condenser faces.

The medium flow returning from the condenser 45, or part of that flow, is passed straight to the evaporator side of the condenser part to be melted, to which any other supply of medium has been discontinued by closing the valve 35 passing into the sector, whereby part of the liquid is vaporized. On increasing the pressure in this sector to a sufficiently high level, the evaporator is converted to a condenser, and the medium vapour formed is condensed on the outer faces of the pipes 34 and delivers its condensation heat to the ice to be melted on the inside face of the pipe.

The use of this melting method requires that the sector parts are sealed relative one another so that the pressure in the evaporator part in the sector at the melting stage can be increased in order to generate the condensation operation.

One mode of utilizing warm but even highly contaminating or corroding flows, e.g. of waste water, by using this method may be a system in accordance with FIG. 3, wherein clean water is passed into the crystallizer and recirculated by separating the ice crystals formed out of the water, and the ice crystals are washed into the waste water, wherein they melt and cool the waste water.

The application of the invention to refrigeration purposes, e.g. to the production of a refrigeration water flow suitable for central refrigeration systems, may be considered self-evident. Ice crystals or larger pieces of ice compressed out of same can also be utilized, e.g., for purposes of the fish processing industry.

FIG. 5 indicates the mass flows, enthalpies, temperatures, and pressures of a system in accordance with FIG. 1 for a heat pump of 6 MW. It is seen that in the condenser 45 the temperature of a water flow of 430,000 kg/h can be raised from 63° C. to 75° C. by into the equipment passing a water flow of 180,000 kg/h whose temperature is 2.5° C. as well as a steam flow of 100 kg/h whose temperature is 100° C. The operation of the pump motors requires a total energy of 2485 kW (without the motor of the agitator in the crystallizer).

What is claimed is:

1. Method for using the heat released by freezing water as a source of heat in a heat pump wherein the water flow to be utilized as the source of heat is evaporated in a first stage at a sufficiently low pressure that freezing of part of the water occurs as a concomitant to vaporization of another part ot yield water vapour, and said water vapour is condensed in a heat exchanging condenser stage that functions as the evaporator of the heat pump, wherein a heat exchanging condenser stage of plural compartments is utilized, and said water vapour is caused to condense, freeze and deposit a layer of ice in at least one but not all of said compartments of said condenser stage while delivering heat of solidification to a heat transfer medium for the heat pump, and concurrently in at least some of the condenser stage compartments in which ice is not then being deposited melting ice previously formed therein, and alternating the use of said compartments.

2. Method according to claim 1, characterized by supplying to said compartments in which ice is to be melted a quantity of water vapour that has been compressed to increase its pressure above its vapor pressure at its freezing point, and condensing said last mentioned water vapour within the corresponding compartments to release ice melting heat therein.

3. Method according to claim 2, characterized in that said quantity of ice melting water vapor is obtained by extracting and recycling some of the vapour produced by said evaporation in the first stage.

4. Method according to claim 2, characterized in that auxiliary thermal energy is imparted to said quantity of water vapor to raise its temperature for effecting said ice melting.

5. Method according to claim 1, characterized in that the water flow to be utilized as the source of heat is treated prior to evaporation in said first stage by at least partially removing dissolved gases from said water.

6. Method according to claim 1, characterized in that water containing ice crystals that has been produced in said condenser stage is treated to remove said ice crystals and recycle the ice free water to said condenser stage.

7. Method according to claim 1, characterized in that said alternating use of said condenser compartments is accomplished by isolating some of said compartments from other of said compartments through the use of inter-compartment valve controlled seals formed by introducing a sealing liquid into a trough to seal a flow passage defined between a wall member projecting into said trough and the base of the trough.

8. Method according to claim 7, characterized in that said sealing liquid is selected from the group consisting of salt solutions, oils, and liquids other than water, all of which have a sufficiently low vapour pressure at the operating conditions of said condenser stage to avoid evaporation of said sealing liquid.

9. Equipment for using the heat of solidification contained in water as a source of heat in a heat pump comprising in combination a heat exchanger for evaporating a heat transfer medium of the heat pump, said heat exchanger having a plurality of separate sections, a crystallizer for simultaneously freezing and boiling a supply of water with said boiling producing water vapour, means for conducting said water vapour to selected ones of said heat exchanger sections, means for extracting water vapour from said selected heat exchanger sections to reduce the pressure therein to the point at which freezing and ice formation occurs therein, means for changing the selection of heat exchanger sections to interrupt freezing said water vapor in at least one of said previously selected sections, and means for melting ice in said at least one section.

10. Equipment according to claim 9, further comprising in combination: means for feeding said supply of water to said crystallizer, a vacuum system coupled to said crystallizer for reducing the pressure within said crystallizer to establish the environment for said simultaneous freezing and boiling of said supply water, said freezing producing ice crystals, duct means coupled to said crystallizer for extracting said ice crystals, valve means disposed between said crystallizer and said heat exchanger sections for selectively directing water vapour from said crystallizer into said selected sections of said heat exchanger for condensation and ice formation therein, and further valve means for selectively directing a heating agent into said at least one heat exchanger section for melting said ice therein.

11. Equipment according to claim 10, wherein said crystallizer and said heat exchanger sections are formed as an integrated structure under a common mantle.

12. Equipment according to claim 11, wherein partition walls are provided in said integrated structure for dividing said crystallizer and said heat exchanger into sections with each section extending from an upper portion of the crystallizer downward through said heat exchanger into a vapour collection compartment disposed beneath said heat exchanger sections, additional valve means being provided between said sections in said vapour collection compartment, and means for controlling all of said valve means to change the selection of heat exchanger sections in which freezing and melting is accomplished.

13. Equipment according to claim 12, wherein said heat exchanger is a falling film-type evaporator located beneath said crystallizer.

14. Equipment according to claim 11, wherein said heat exchanger is a falling film-type evaporator located beneath said crystallizer.

15. Equipment according to claim 10, wherein each of said valve means comprises a liquid seal formed by a trough and a wall member extending into said trough so as to define a flow passage between an edge of said wall and the bottom of said trough, and means for selectively introducing sealing liquid into said trough.

16. Method according to claim 1, characterized in that said condenser stage compartments operate in parallel with said water vapour being fed to less than all of said compartments on a rotating basis such that each of said condenser compartments is periodically isolated from said supply of water vapour, at least partially removing each of said condenser compartments from the evaporator circuit of said heat pump when said condenser compartment is isolated from said supply of water vapour, and melting of said layer of ice in said isolated condenser compartment by condensing heat releasing condensate therein.

17. Method according to claim 16 characterized by producing said heat releasing condensate by supplying to said isolated condenser compartment a quantity of said water vapour that has been compressed to increase its pressure above its vapor pressure at its freezing point.

* * * * *